United States Patent [19]
Wallace

[11] 3,982,348
[45] Sept. 28, 1976

[54] FISHING ROD HANDLE AND REEL

[76] Inventor: Maynard Wallace, 38172 Seaway Drive, Mount Clemens, Mich. 48043

[22] Filed: July 14, 1975

[21] Appl. No.: 595,358

[52] U.S. Cl. .................................. 43/20; 43/23
[51] Int. Cl.² ................. A01K 87/00; A01K 89/02
[58] Field of Search ................. 43/18, 20, 22, 23

[56] References Cited
UNITED STATES PATENTS

| | | |
|---|---|---|
| 1,605,710 | 11/1926 | Ford .................................... 43/20 |
| 2,402,882 | 6/1946 | Garr ..................................... 43/20 |
| 2,535,404 | 12/1950 | Fry ...................................... 43/20 |
| 2,551,473 | 5/1951 | Thompson ............................ 43/20 |

Primary Examiner—Warner H. Camp
Attorney, Agent, or Firm—Harness, Dickey & Pierce

[57] ABSTRACT

A molded, lightweight and floating fishing rod handle having a reel directly mounted thereon to form a compact unit. A releasable stop is slidably mounted on the handle and has a concealed portion engageable with the reel.

7 Claims, 2 Drawing Figures

U.S. Patent   Sept. 28, 1976   3,982,348
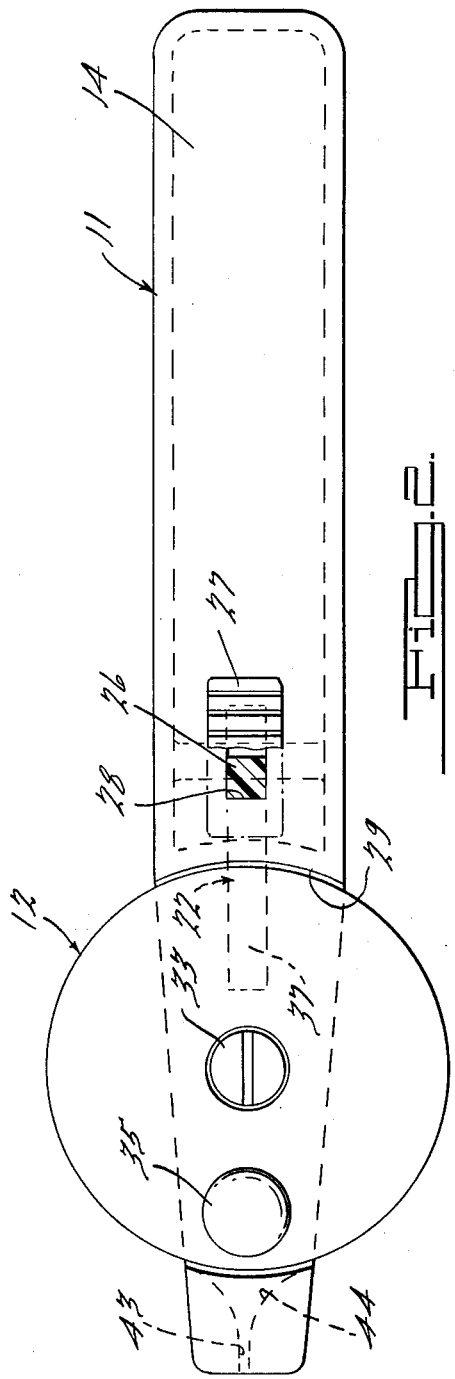
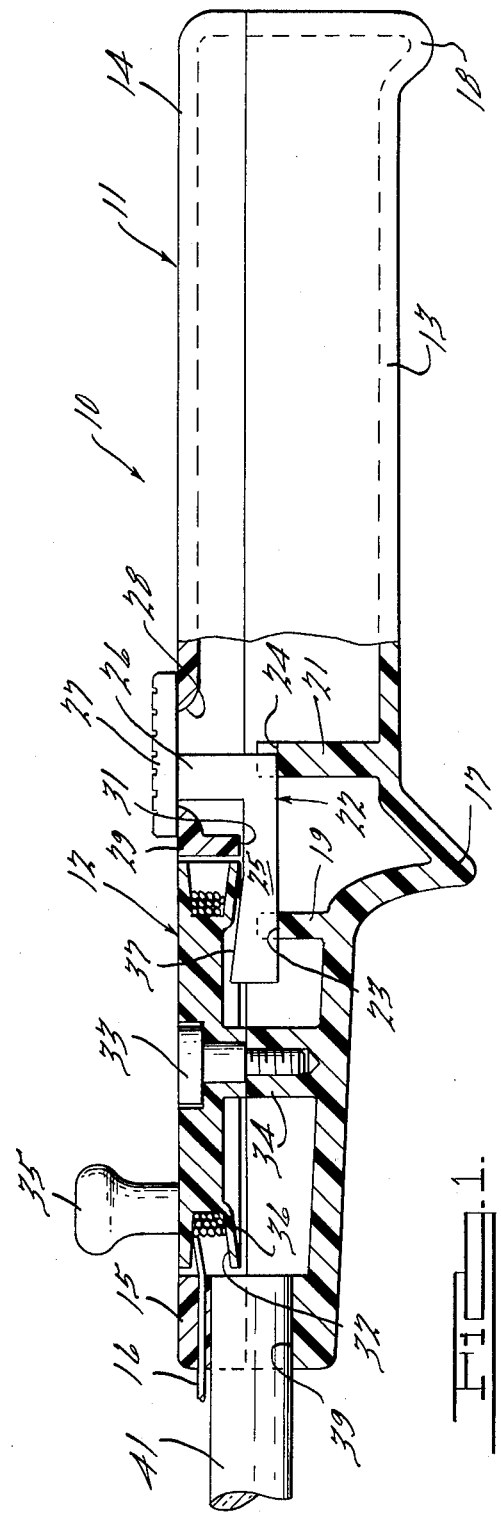

FISHING ROD HANDLE AND REEL

BACKGROUND OF THE INVENTION

1. Field of the Invention

The invention relates to fishing rod handles and reels, and more particularly to economical equipment of this type intended for children, ice fishing or similar uses.

2. Description of the Prior Art

Conventional fishing rod handles have outside mounted reels secured thereto by means such as metal springs or wires. Not only is such equipment relatively awkward and cumbersome, but the parts and labor needed to attach the reel to the handle increase the expense of the unit.

BRIEF SUMMARY OF THE INVENTION

It is an object of the present invention to provide a novel and improved fishing rod handle and reel which is relatively inexpensive to manufacture, requires very few parts, and is well suited for use by children or in other situations where economical yet reliable fishing equipment is needed.

It is a further object to provide an improved fishing handle and reel of this type which has a hollow handle interfitting with the reel and also having the function of a floating handle in case the fishing rod is dropped into the water.

It is another object to provide a fishing rod and handle of this nature which is compact, has relatively few moving parts, and in which the releasable reel stop is concealed and protected.

Briefly, the invention comprises an elongated fishing rod handle, the rear portion of the handle being enclosed, the forward portion being upwardly open, a reel rotatably mounted in the upwardly open forward portion of the handle, line guide means on the handle forwardly of the reel, a releasable stop slidably mounted on the handle rearwardly of the reel, and complementary inclined surfaces on said stop and reel, the stop being movable between a releasing position in which said surfaces are separated and a braking position in which the surfaces are engaged.

BRIEF DESCRIPTION OF THE DRAWINGS

FIG. 1 is a partly sectioned side elevational view of the fishing rod handle and reel of this invention, the releasable stop being shown in its releasing position, and FIG. 2 is a top plan view of the structure.

DESCRIPTION OF THE PREFERRED EMBODIMENT

The fishing rod handle and reel assembly is generally indicated at 10 and comprises a handle generally indicated at 11 and a reel generally indicated at 12. Handle 11 is preferably of molded construction and has three basic sections, a lower section 13, an upper section 14, and a forward section 15 which, as will appear later, forms part of guide means for the fishing line 16. Handle sections 13 and 14 are of hollow elongated shape with mating surfaces and curved construction to fit the hand, part 13 preferably having enlargements 17 and 18 between which the fingers will grasp the handle. Upwardly extending guides 19 and 21 are formed within an intermediate portion of handle section 13 for supporting and guiding a releasable stop generally indicated at 22. Guides 19 and 21 have slots 23 and 24 respectively which guide the lower leg 25 of stop 22 in the longitudinal direction of the handle. The stop has an upwardly extending portion 26 surmounted by a thumb-engageable member 27 resting on top of handle section 14. This handle section has an opening 28 through which portion 26 extends, the portion 29 of handle section 14 forwardly of opening 28 being curved to interfit with reel 12, as seen in FIG. 2. The underside 31 of handle portion 29 is disposed above portion 25 of stop 22 to retain the stop in its guided position.

Reel 12 has a groove 32 for the reception of line 16 and is rotatably mounted by a bolt 33 on an upstanding portion 34 within handle section 13 forwardly of stop 22. Since handle section 14 terminates at its forward portion 29, handle section 13 is upwardly open in the area of reel 12. A turning handle 35 is carried by reel 12. Preferably, the turning handle is molded integrally with the reel and is smooth to facilitate turning and eliminate the need for a pivotal mount.

The outer lower surface 36 of reel 12 is inclined upwardly toward the center, and a complementary surface 37 is formed on the upper edge of stop portion 25. When stop 22 is in its releasing position as shown in FIG. 1, surface 37 will be withdrawn from surface 36, permitting free rotation of the reel. However, when slide 22 is retracted from its FIG. 1 position, stop surface 37 will engage reel surface 36 to act as a brake and stop reel rotation. Because of the inclined nature of the surfaces, considerable braking force may be applied, with guides 19 and 21 supporting stop portion 25.

The forward end of handle section 13 has a socket 39 for the reception of a rod 41. Its upper surface is formed with a narrow slot 43 for the passage of line 16. Passage 43 leads to a flared portion 44 so that the line will not be snagged or tangled during operation. Section 15 of the handle may be suitably secured to the upper surface and thus serves to enclose passages 43 and 44.

In operation, the fisherman will grasp handle 10 with the fingers of one hand, the thumb being available to slide stop 22 back and forth. The operator's other hand may be used to rotate guide reel 12. It should be observed that the operative portions of the releasable stop means are concealed and that the upper surface of reel 12 is flush with the upper surface of handle 10, thus forming an extremely compact arrangement. The assembly consists of only six parts and is thus extremely inexpensive to manufacture. The hollow rear portion of handle 10 will assist in causing the handle to float should the fishing rod be dropped in the water.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A combined fishing rod handle and reel comprising an elongated fishing rod handle, the rear portion of the handle being enclosed, the forward portion being upwardly open, a reel with a line groove rotatably mounted in the upwardly open forward portion of the handle and having upwardly and downwardly facing surfaces facing away from the line groove, line guide means on the handle forwardly of the reel, a releasable stop slidably mounted on the handle rearwardly of the reel, and complementary inclined surfaces on said stop and reel, the inclined surface on said reel being part of said downwardly facing surface, the stop having a thumb-engageable portion disposed rearwardly of the reel and being movable between a releasing position in which said complementary inclined surfaces are separated and a braking position in which the complementary inclined surfaces are engaged.

2. A combined fishing rod handle and reel according to claim 1, the rearward portion of said handle being hollow, whereby the handle will tend to float when the fishing rod is dropped in the water.

3. A combined fishing rod handle and reel comprising an elongated fishing rod handle, the rear portion of the handle being enclosed, the forward portion being upwardly open, a reel rotatably mounted in the upwardly open forward portion of the handle, line guide means on the handle forwardly of the reel, a releasable stop slidably mounted on the handle rearwardly of the reel, said releasable stop comprising an L-shaped member having a first portion extending in the direction of the handle, slotted guide means formed inside said handle and supporting said last-mentioned portion of the stop, and a thumb-accessible member on said stop above the surface of said handle, and complementary inclined surfaces on said stop and reel, the stop being movable between a releasing position in which said surfaces are separated and a braking position in which the surfaces are engaged.

4. A combined fishing rod handle and reel according to claim 3, one of said complementary surfaces being on said guided portion of said stop, the other surface being on the outer lower portion of said reel.

5. A combined fishing rod handle and reel according to claim 1, said reel being nested within the forward portion of said handle, the upper surface of said reel and handle being substantially flush.

6. A combined fishing rod handle and reel according to claim 1, said line guide means comprising contiguous longitudinal and flared passages formed in the forward end of said handle by constructing the handle of two separate parts separable at said passages.

7. A combined fishing rod handle and reel comprising an elongated handle fabricated of hollow upper and lower sections having facing surfaces, a third section being at the forward end of the handle and combining with the lower section to form a line guide passage, the rearward portions of the handle sections being hollow so as to float, a reel nested within an upwardly open forward portion of said handle and rotatably mounted thereon, a releasable stop mounted in said handle rearwardly of said reel, guide means formed in the lower handle section for slidably supporting said stop between releasing and braking positions, a portion of the upper section of said handle being formed adjacent said stop to prevent removal thereof, and complementary inclined surfaces on said reel and stop for creating said braking action.

* * * * *